US007965287B2

(12) United States Patent
Tu et al.

(10) Patent No.: US 7,965,287 B2
(45) Date of Patent: Jun. 21, 2011

(54) POWER SUPPLY SWITCHING CIRCUIT CAPABLE OF VOLTAGE REGULATION AND FLAT PANEL DISPLAY USING SAME

(75) Inventors: Jia-Hui Tu, Shenzhen (CN); Tong Zhou, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 888 days.

(21) Appl. No.: 11/982,862

(22) Filed: Nov. 5, 2007

(65) Prior Publication Data

US 2008/0106543 A1 May 8, 2008

(30) Foreign Application Priority Data

Nov. 3, 2006 (TW) ............................... 95140748 A

(51) Int. Cl.
*G06F 3/038* (2006.01)

(52) U.S. Cl. ....................................... 345/211; 323/271

(58) Field of Classification Search .......... 345/211-213; 323/271; 327/405, 407, 544; 363/74
See application file for complete search history.

(56) References Cited

U.S. PATENT DOCUMENTS

| | | | | |
|---|---|---|---|---|
| 5,065,053 | A * | 11/1991 | Chan et al. | 327/346 |
| 6,204,576 | B1 | 3/2001 | Chou et al. | |
| 6,943,786 | B1 * | 9/2005 | Birk et al. | 345/204 |
| 2003/0030385 | A1 * | 2/2003 | Toyama | 315/291 |
| 2006/0192605 | A1 * | 8/2006 | Suzuki et al. | 327/333 |

* cited by examiner

*Primary Examiner* — Chanh Nguyen
*Assistant Examiner* — Ram A Mistry
(74) *Attorney, Agent, or Firm* — Wei Te Chung

(57) ABSTRACT

An exemplary power supply switching circuit (200) includes a first input (210) for receiving a first signal, a second input (220) for receiving a second signal, a voltage regulating circuit (240), and a signal switching circuit (250). The voltage regulating circuit includes semiconductor elements (241) electrically coupled in series. The signal switching circuit includes a first input terminal (253), a second input terminal (254), and an output terminal (255). The first input is electrically coupled to the first input terminal via the first voltage regulating circuit, the second input is electrically coupled to the second input terminal, and the output terminal is configured to be an output of the power supply switching circuit. The first voltage regulating circuit regulates the first signal via the voltage drops of the first semiconductor elements. A flat panel display using the power supply switching circuit is also provided.

16 Claims, 3 Drawing Sheets

POWER SUPPLY SWITCHING CIRCUIT CAPABLE OF VOLTAGE REGULATION AND FLAT PANEL DISPLAY USING SAME

FIELD OF THE INVENTION

The present invention relates to a power supply switching circuit capable of voltage regulation, and a flat panel display using the power supply switching circuit.

GENERAL BACKGROUND

Power supply switching circuits are widely used in modern electronic products such as flat panel displays. The power supply switching circuit is typically used for switching between two or more input voltage signals when the electronic product is in different working states. Generally, the power supply switching circuit is also capable of regulating the input voltage signals, so as to provide a desired output voltage signal for the electronic product.

FIG. 6 is a diagram of a conventional power supply switching circuit. The power supply switching circuit 100 includes a first input 110, a second input 120, a first diode 150, a second diode 160, a voltage regulator 140, and an output 130. The voltage regulator 140 is a direct current to direct current (DC-DC) regulator, which includes an input terminal 141 and an output terminal 142.

The first input 110 and the second input 120 are configured to receive a first voltage signal and a second voltage signal, respectively. The first diode 150 together with the second diode 160 are configured to switch the power supply switching circuit 100, so that the power supply switching circuit 100 receives a selected one of the first and second voltage signals. Positive terminals of the first and second diodes 150 and 160 are electrically coupled to the first input 110 and the second input 120, respectively. Both negative terminals of the first and second diodes 150 and 160 are electrically coupled to the input terminal 141 of the voltage regulator 140. The output terminal 142 of the voltage regulator 140 is electrically coupled to the output 130 of the power supply switching circuit 100. An electrolytic capacitor (not labeled) and a ceramic capacitor (not labeled) are electrically coupled in parallel between the voltage regulator 140 and ground.

In operation, the power supply switching circuit 100 has two working states. In a first working state, the first voltage signal is applied to the first input 110 and the second voltage signal is cut off. In this situation, the first diode 150 is in an on state and the second diode 160 is in an off state. The power supply switching circuit 100 is switched to receive the first voltage signal. Then the first voltage signal is regulated by the voltage regulator 140, and converted to a desired output voltage signal. Finally, the output voltage signal is outputted via the output 130.

In a second working state, the first voltage signal is cut off and the second voltage signal is applied to the second input 120. In this situation, the first diode 150 is in an off state and the second diode 160 is in an on state. The power supply switching circuit 100 is switched to receive the second voltage signal. Then the second voltage signal is regulated by the voltage regulator 140, and converted to a desired output voltage signal. Finally, the output voltage signal is outputted via the output 130.

A typical flat panel display, such as a liquid crystal display, employs the power supply switching circuit 100 to carry out the function of input signal switching and voltage regulation. In the power supply switching circuit 100, the first diode 110, the second diode 120, and the voltage regulator 140 are all essential elements. The DC-DC voltage regulator 140 is usually expensive. As a result, the cost of the power supply switching circuit 100 and the flat panel display employing the power supply switching circuit 100 are both high.

It is, therefore, desired to provide a power supply switching circuit and a flat panel display employing the power supply switching circuit that can overcome the above-described deficiencies.

SUMMARY

In one aspect, a power supply switching circuit includes a first input for receiving a first signal, a second input for receiving a second signal, a voltage regulating circuit, and a signal switching circuit. The voltage regulating circuit includes semiconductor elements electrically coupled in series. The signal switching circuit includes a first input terminal, a second input terminal, and an output terminal. The first input is electrically coupled to the first input terminal via the first voltage regulating circuit, the second input is electrically coupled to the second input terminal, and the output terminal is configured to be an output of the power supply switching circuit. The first voltage regulating circuit regulates the first signal via the voltage drops of the first semiconductor elements.

In another aspect, a flat panel display includes a power supply module for providing a first signal and a second signal, a power supply switching circuit, and a display module. The power supply switching circuit includes a first input, a second input, a voltage regulating circuit, and a signal switching circuit. The voltage regulating circuit includes a plurality of semiconductor elements connected in series. The first and second inputs receive the first and second signals respectively. The voltage regulating circuit regulates the first signal via voltage drops of semiconductor elements, the signal switching circuit is switched to receive one of the regulated first signal and the second signal according to a value of the regulated first signal and the second signal, and outputs the corresponding signal to the display module.

Other novel features and advantages of the present power supply switching circuit and flat panel display will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments of the present invention in detail.

Figure 1:
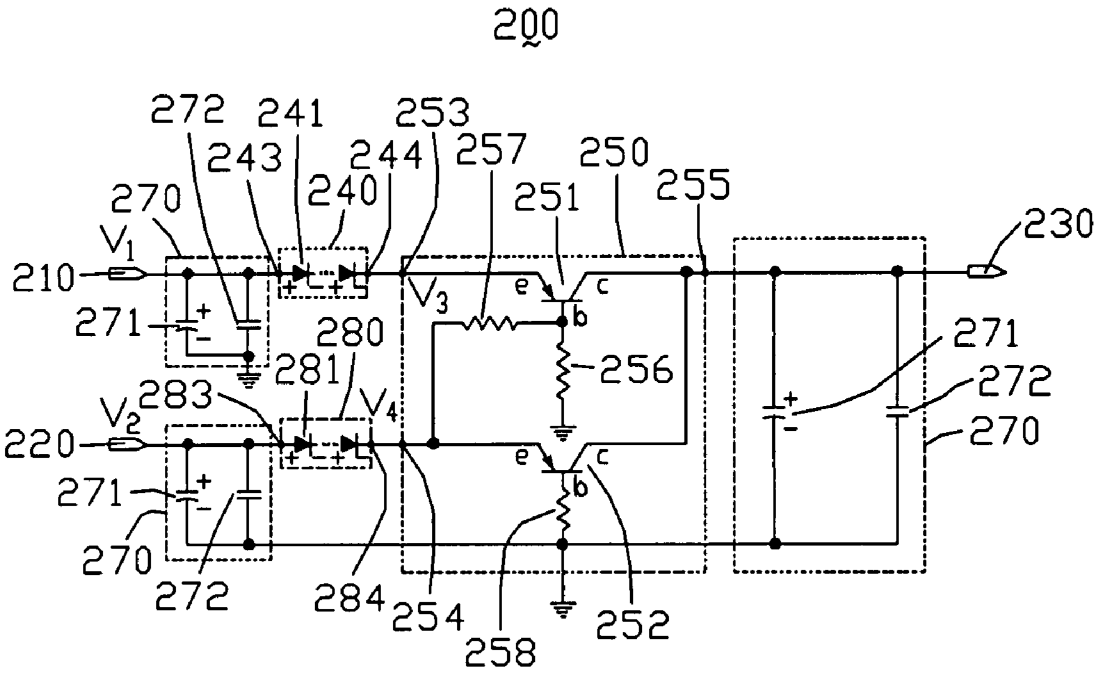
FIG. 1 is a diagram of a power supply switching circuit according to a first exemplary embodiment of the present invention.

FIG. 1 is a diagram of a power supply switching circuit 200 according to a first exemplary embodiment of the present invention. The power supply switching circuit 200 includes a first input 210, a second input 220, a first voltage regulating circuit 240, a second voltage regulating circuit 280, a signal switching circuit 250, and an output 230.

The first input 210, the second input 220, and the output 230 are each grounded via a respective filtering circuit 270. Each of the filtering circuits 270 includes an electrolytic capacitor 271 and a ceramic capacitor 272 electrically coupled in parallel. The positive terminal of the electrolytic capacitor 271 is electrically coupled to the corresponding input/output 210, 220, 230. The negative terminal of the electrolytic capacitor 271 is directly connected to ground. The first input 210 and the second input 220 are configured to receive a first voltage signal $V_1$ and a second voltage signal $V_2$, respectively. The electrolytic capacitors 271 are configured to filter interference signals having low frequency, and the ceramic capacitors 272 are configured to filter interference signals having high frequency.

The first and second voltage regulating circuits 240 and 280 are configured to regulate the respective input voltage $V_1$, $V_2$ to a desired value. The first voltage regulating circuit 240 includes a plurality of first diodes 241 (only two are shown in FIG. 1). The first diodes 241 are electrically coupled in series, so as to form a first diode string. A positive terminal of each first diode 241 is electrically coupled to a negative terminal of the previous first diode 241. The positive terminal of the foremost first diode 241, which is an end of the first diode string, serves as an input terminal 243 of the first voltage regulating circuit 240. The input terminal 243 is electrically coupled to the first input 210. The negative terminal of the last first diode 241, which is the other end of the first diode string, serves as an output terminal 244 of the first voltage regulating circuit 240.

The second voltage regulating circuit 280 includes a plurality of second diodes 281 (only two are shown in FIG. 1). The second diodes 281 are electrically coupled in series, so as to form a second diode string. A positive terminal of each second diode 281 is electrically coupled to a negative terminal of the previous second diode 281. The positive terminal of the foremost second diode 281 serves as an input terminal 283 of the second voltage regulating circuit 280, and is electrically coupled to the second input 220. The negative terminal of the last second diode 281 serves as an output terminal 284 of the second voltage regulating circuit 280.

The signal switching circuit 250 includes a first transistor 251 and a second transistor 252. Both of the first and second transistors 251 and 252 are positive-negative-positive type bipolar junction transistors (PNP-BJTs). An emitter electrode of the first transistor 251 serves as a first input terminal 253 of the signal switching circuit 250, and is electrically coupled to the output terminal 244 of the first voltage regulating circuit 240. A collector electrode of the first transistor 251 serves as an output terminal 255 of the signal switching circuit 250. A base electrode of the first transistor 251 is grounded via a first resistor 256, and is electrically coupled to an emitter electrode of the second transistor 252 via a second resistor 257. The emitter electrode of the second transistor 252 serves as a second input terminal 254 of the signal switching circuit 250, and is electrically coupled to the output terminal 284 of the second voltage regulating circuit 280. A collector terminal of the second transistor 252 is electrically coupled to the output terminal 255. A base electrode of the second transistor 252 is grounded via a third resistor 258.

In operation, the power supply switching circuit 200 has two main working states. In a first working state, the first voltage signal $V_1$ is applied to the first input 210 and the second voltage signal $V_2$ is cut off. In this situation, firstly, the first voltage signal $V_1$ is regulated by the first voltage regulating circuit 240. In detail, when the first voltage signal $V_1$ is received by the input terminal 243 of the first voltage regulating circuit 240, all of the first diodes 241 are in an on state. A forward voltage drop of each of the first diodes 241 is generally in the range from 0.6V (volts) to 0.8V. Therefore the plural first diodes 241 in the first voltage regulating circuit 240 consume about 0.7 NV of the first voltage signal $V_1$, where N is the number of first diodes 241. That is, the first voltage signal $V_1$ is reduced about 0.7 NV and converted to a first regulated voltage signal $V_3$. The first regulated voltage signal $V_3$ is then outputted to the first input terminal 253 of the signal switching circuit 250. Moreover, because the second voltage signal $V_2$ is cut off, all of the second diodes 281 in the second voltage regulating circuit 280 are in an off states, and no signal is applied to the second input terminal 254 of the signal switching circuit 250. As a result, the first transistor 251 is in an on state, and the second transistor 252 is in an off state. Secondly, the first regulated voltage signal $V_3$ is transmits through the first transistor 251 and becomes an output voltage signal $V_0$. In addition, a saturation voltage drop of a PNP-BJT is typically in the range from 0.15V to 0.3V. That is, the saturation voltage drop of the first transistor 251 is slight, and has little influence on the first regulated voltage signal $V_3$ when the first regulated voltage signal $V_3$ transmits through the first transistor 251. For the present purposes, the saturation voltage drop of the first transistor 251 can be ignored. Finally, the output voltage signal $V_0$ is outputted via the output 230.

In a second working state, the first voltage signal $V_1$ is cut off and the second voltage signal $V_2$ is applied to the second input 220. The structure and functioning of the second voltage regulating circuit 280 are similar to those of the first voltage regulating circuit 240. Thus, the second voltage signal $V_2$ is reduced about 0.7 PV by the second voltage regulating circuit 280 and converted to a second regulated voltage signal $V_4$, where P is the number of second diodes 281. In the signal switching circuit 250, the second input terminal 254 receives the second regulated voltage signal $V_4$, and no signal is applied to the first input terminal 253. Thus, the first transistor 251 is in an off state and the second transistor 252 is in an on state. The second regulated voltage signal $V_4$ then transmits through the second transistor 252, and is outputted via the output 230.

Moreover, the power supply switching circuit 200 may have a third working state if both of the first voltage signal $V_1$ and the second voltage signal $V_2$ are applied to the respective first and second inputs 210 and 220 simultaneously. In this situation, the first voltage signal $V_1$ is regulated by the first voltage regulating circuit 240 via the forward voltage drops of the first diodes 241. Thus the first voltage signal $V_1$ is converted to a first regulated voltage signal $V_3$ and outputted to the first input terminal 253 of the signal switching circuit 250. The second voltage signal $V_2$ is regulated by the second voltage regulating circuit 280 via the forward voltage drops of the second diodes 281. Thus the second voltage signal $V_2$ is converted to a second regulated voltage signal $V_4$ and outputted to the second input terminal 254 of the signal switching circuit 250. In the signal switching circuit 250, due to the second regulated voltage signal $V_4$, the second transistor 252 is in the on state. Therefore, the voltage of the output terminal 253 is clamped to be the second regulated voltage signal $V_4$ by the on state second transistor 252. That is, the second regulated voltage signal $V_4$ is still outputted to the output 230 via the second transistor 252.

As a result, when only one of the input voltage signals $V_1$ and $V_2$ is applied to the power supply switching circuit 200, the power supply switching circuit 200 switches to the corresponding input 210, 220 which duly receives the input voltage signal $V_1$ or $V_2$. Moreover, as long as the second voltage signal $V_2$ is applied to the second input 220, the power supply switching circuit 200 maintains output of the second regulated voltage signal $V_4$ only, even if the first voltage signal $V_1$ is applied to the first input 210 simultaneously.

In summary, the power supply switching circuit 200 carries outs the function of input signal switching via the first and second transistors 251 and 252, and regulates the input voltage signals $V_1$ and $V_2$ via the forward voltage drops of the first and second diodes 241 and 281. Because the transistors 251 and 252, as well as the first and second diodes 241 and 281, are all relatively inexpensive discrete semiconductor elements, the power supply switching circuit 200 has a low cost.

Furthermore, the number of first and second diodes 241 and 281 can be determined according to particular voltage regulating requirements. The first and second diodes 241 and 281 can for example be positive negative (PN) junction diodes or Schottky barrier diodes (SBDs).

Figure 2:
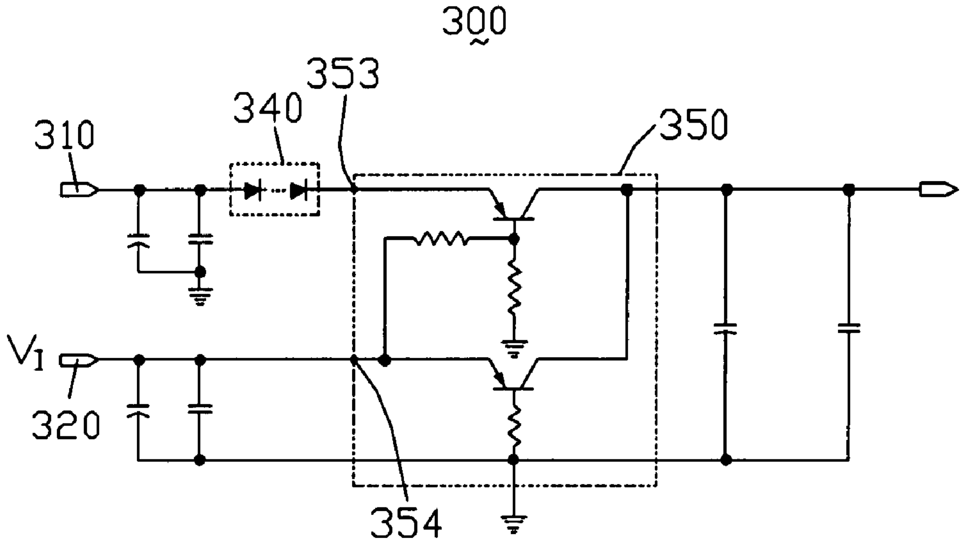
FIG. 2 is a diagram of a power supply switching circuit according to a second exemplary embodiment of the present invention.

FIG. 2 is a diagram of a power supply switching circuit 300 according to a second exemplary embodiment of the present invention. The power supply switching circuit 300 is similar to the above-described power supply switching circuit 200. However, the power supply switching circuit 300 includes a first input 310, a second input 320, a voltage regulating circuit 340, and a signal switching circuit 350. The signal switching circuit 350 includes a first input terminal 353 and a second input terminal 354. The first input 310 is electrically coupled to the first input terminal 353 of the signal switching circuit 350 via the voltage regulating circuit 340. The second input 320 is electrically coupled to the second input terminal 354 of the signal switching circuit 350.

The power supply switching circuit 300 is configured for an application in which one of the input voltage signals, labeled $V_1$, meets an output requirement of the power supply switching circuit 300. In particular, the power supply switching circuit 200 maintains output of the input voltage signal $V_1$, as long as the input voltage signal $V_1$ is applied to the second input 320.

Figure 3:
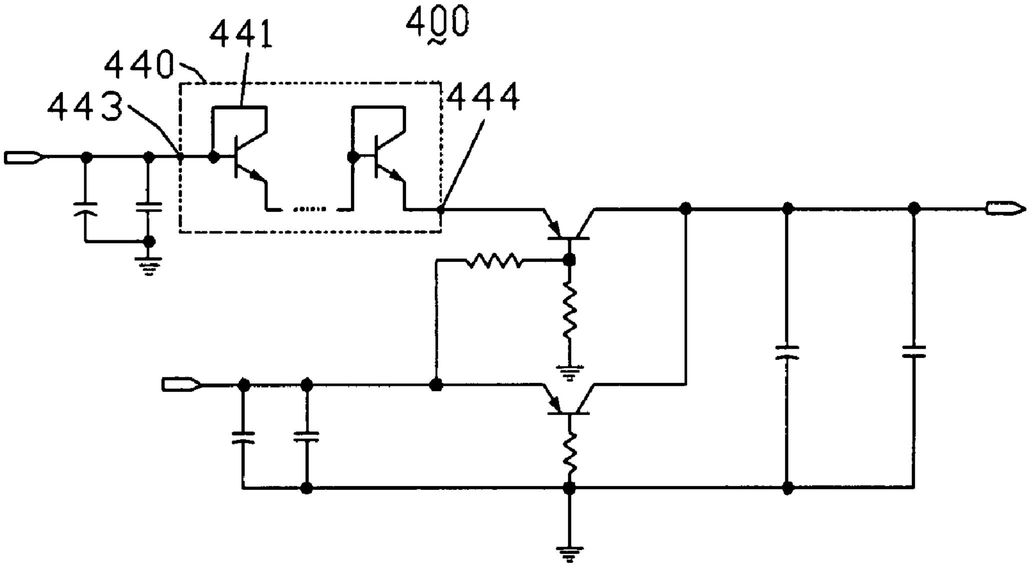
FIG. 3 is a diagram of a power supply switching circuit according to a third exemplary embodiment of the present invention.

FIG. 3 is a diagram of a power supply switching circuit 400 according to a third exemplary embodiment of the present invention. The power supply switching circuit 400 is similar to the above-described power supply switching circuit 300. However, the power supply switching circuit 400 includes a voltage regulating circuit 440. The voltage regulating circuit 440 includes a plurality of transistors 441 (only two are shown in FIG. 3). The transistors 441 are negative-positive-negative type bipolar junction transistors (NPN-BJTs). The collector electrode of each transistor 441 is electrically coupled to the base electrode of the same transistor 441. The plural collector-base coupled transistors 441 are electrically coupled in series, so as to form a first transistor string. In particular, a base electrode of each transistor 441 is electrically coupled to an emitter electrode of the previous transistor 441. The base electrode of the foremost transistor 441, which is an end of the first transistor string, serves as an input terminal 443 of the voltage regulating circuit 440. The emitter electrode of the last transistor 441, which is the other end of the first transistor string, serves as an output terminal 444 of the voltage regulating circuit 440.

Figure 4:
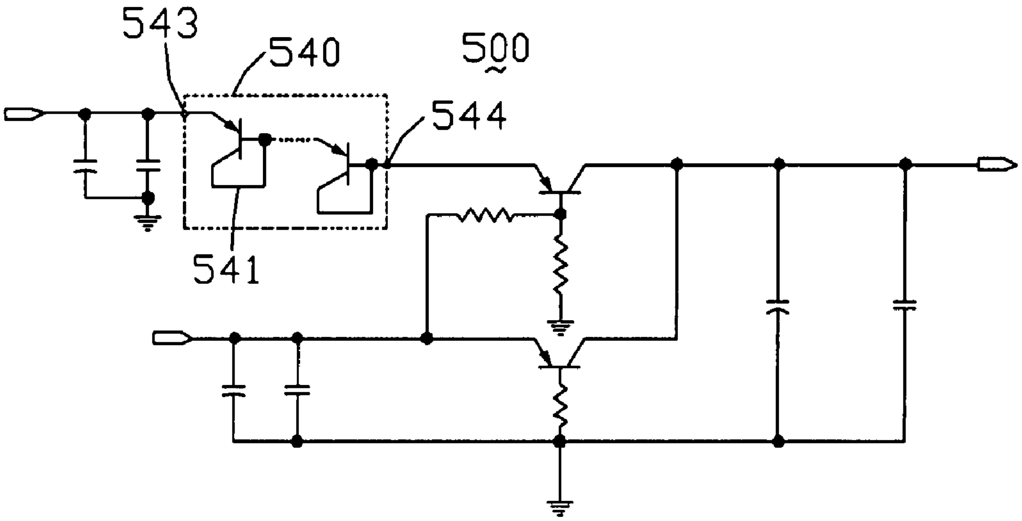
FIG. 4 is a diagram of a power supply switching circuit according to a fourth exemplary embodiment of the present invention.

FIG. 4 is a diagram of a power supply switching circuit 500 according to a fourth exemplary embodiment of the present invention. The power supply switching circuit 500 is similar to the above-described power supply switching circuit 300. However, the power supply switching circuit 500 includes a voltage regulating circuit 540. The voltage regulating circuit 540 includes a plurality of transistors 541. The transistors 541 are PNP-BJTs. The collector electrode of each transistor 541 is electrically coupled to the base electrode of the same transistor 541. The plural collector-base coupled transistors 541 are electrically coupled in series, so as to form a second transistor string. In particular, an emitter electrode of each transistor 541 is electrically coupled to a base electrode of the previous transistor 541. The emitter electrode of the foremost transistor 541, which is an end of the second transistor string, serves as an input terminal 543 of the voltage regulating circuit 540. The base electrode of the last transistor 541, which is the other end of the second transistor string, serves as an output terminal 544 of the voltage regulating circuit 540.

In the power supply switching circuits 400 and 500, the input voltage signals are regulated to desired values via the saturation voltage drops of the transistors 441 and 541, respectively. Moreover, another voltage regulating circuit can further be disposed in each power supply switching circuit 400, 500, which is configured to regulate a second input voltage signal applied to the second input (not labeled) of the power supply switching circuit 400, 500.

Figure 5:
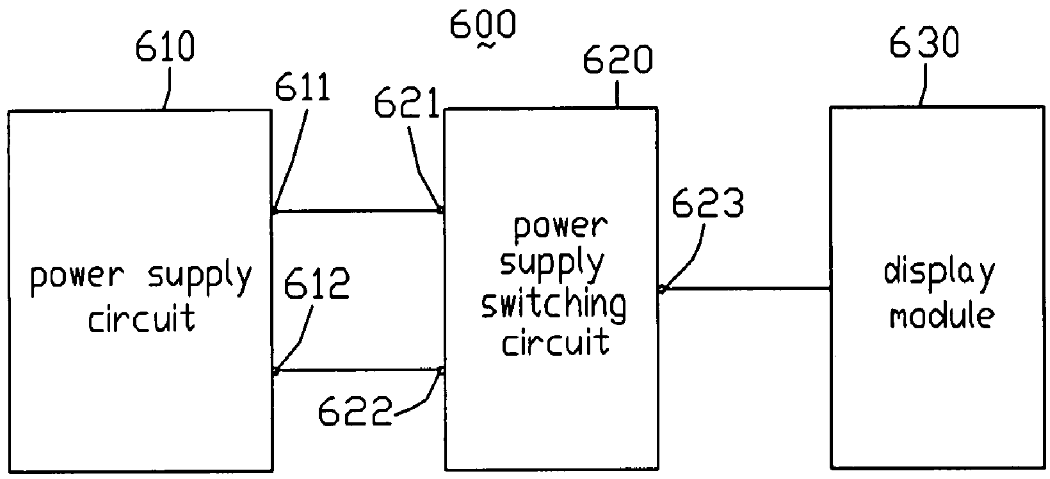
FIG. 5 is a block diagram of a flat panel display according to the present invention.
Figure 6:
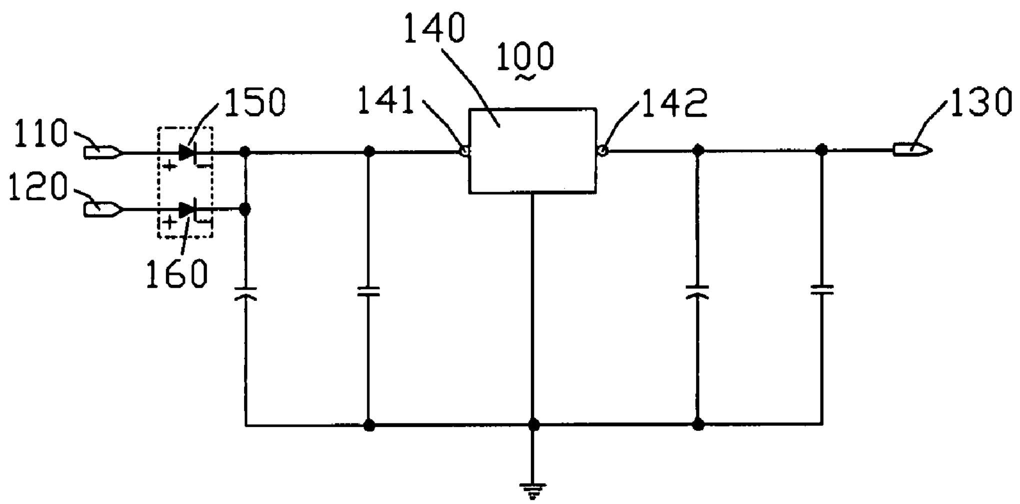
FIG. 6 (RELATED ART)
FIG. 6 is a diagram of a conventional power supply switching circuit.

FIG. 5 is a block diagram of an exemplary flat panel display according to the present invention. The flat panel display 600 includes a power supply circuit 610, a power supply switching circuit 620, and a display module 630. The power supply circuit 610 includes a first output terminal 611 configured to output a first voltage signal, and a second output terminal 612 configured to output a second voltage signal. The power supply switching circuit 620 can be any one of the above-described power supply switching circuits 200, 300, 400, and 500; and includes a first input 621, a second input 622, and an output 623. The first input 621, the second input 622, and the output 623 are electrically coupled to the first output terminal 611, the second output terminal 612, and the display module 630, respectively. The display module 630 can for example be one of a liquid crystal display panel, a plasma display panel, and an organic light emitting display panel.

Typically, the power supply circuit 610 provides a first voltage signal of 5V and a second voltage signal of 3.3V. As an example, the power supply switching circuit 620 is taken to be the above-described power supply switching circuit 300, and the number of diodes in the voltage regulating circuit 340 is assumed to be two. Thus, the power supply switching circuit 620 outputs a voltage of about 3.3V to enable the display module 630 to display images. Due to the relatively inexpensive discrete semiconductor elements in the power supply switching circuit 300, the flat panel display 600 also has a low cost.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present invention to the full extent indicated by the broad general meaning of the terms in which the appended claims are expressed.

What is claimed is:

1. A power supply switching circuit, comprising:

a first input configured to receive a first signal;

a second input configured to receive a second signal;

a first voltage regulating circuit comprising a plurality of first semiconductor elements electrically coupled in series; and a signal switching circuit configured for switching between the first and second signals, the signal switching circuit comprising a first input terminal, a second input terminal, and an output terminal;

wherein the first input is electrically coupled to the first input terminal of the signal switching circuit via the first voltage regulating circuit, the second input is electrically coupled to the second input terminal of the signal switching circuit, the output terminal of the signal switching circuit is configured to be an output of the power supply switching circuit, and the first voltage regulating circuit is configured to regulate the first signal according to voltage drops of the first semiconductor elements;

wherein the signal switching circuit further comprises a first transistor and a second transistor, an emitter electrode and a collector electrode of the first transistor are respectively configured to be the first input terminal and the output terminal, a base electrode of the first transistor is directly grounded through a resistor and directly electrically coupled to an emitter electrode of the second transistor through a resistor, the emitter electrode of the second transistor is configured to be the second input terminal, a base electrode of the second transistor is directly grounded through a resistor, and the collector electrode of the second transistor is electrically coupled to the output terminal.

2. The power supply switching circuit as claimed in claim 1, wherein each of the first and second transistors is a positive-negative-positive type bipolar junction transistor.

3. The power supply switching circuit as claimed in claim 1, wherein the first semiconductor elements are first diodes, a positive terminal of each first diode is electrically coupled to a negative terminal of the previous first diode, the positive terminal of the foremost first diode is electrically coupled to the first input of the power supply switching circuit, the negative terminal of the last first diode is electrically coupled to the first input terminal of the signal switching circuit.

4. The power supply switching circuit as claimed in claim 1, wherein the first semiconductor elements are negative-positive-negative type bipolar junction transistors whose collector electrodes are electrically coupled to their own base electrodes, a base electrode of each transistor is electrically coupled to an emitter electrode of the previous transistor, the base electrode of the foremost transistor is electrically coupled to the first input of the power supply switching circuit, the emitter electrode of the last transistor is electrically coupled to the first input terminal of the signal switching circuit.

5. The power supply switching circuit as claimed in claim 1, wherein the first semiconductor elements are positive-negative-positive type bipolar junction transistors whose collector electrodes are electrically coupled to their own base electrodes, an emitter electrode of each transistor is electrically coupled to a base electrode of the previous transistor, the emitter electrode of the foremost transistor is electrically coupled to the first input of the power supply switching circuit, the base electrode of the last transistor is electrically coupled to the first input terminal of the signal switching circuit.

6. The power supply switching circuit as claimed in claim 1, further comprising a second voltage regulating circuit electrically coupled between the second input of the power supply switching circuit and the second input terminal of the signal switching circuit, wherein the second voltage regulating circuit comprises a plurality of second semiconductor elements electrically coupled in series.

7. The power supply switching circuit as claimed in claim 6, wherein the second semiconductor elements are second diodes, a positive terminal of each second diode is electrically coupled to a negative terminal of the previous second diode, the positive terminal of the foremost second diode is electrically coupled to the second input of the power supply switching circuit, the negative terminal of the last second diode is electrically coupled to the second input terminal of the signal switching circuit.

8. The power supply switching circuit as claimed in claim 1, wherein each of the first input, the second input, and the output is grounded via a respective filtering circuit, each of which comprises an electrolytic capacitor and a ceramic capacitor electrically coupled in parallel.

9. A flat panel display, comprising:

a power supply circuit configured to provide a first signal and a second signal;

a power supply switching circuit comprising a first input, a second input, a voltage regulating circuit, and a signal switching circuit, the voltage regulating circuit comprising a plurality of semiconductor elements connected in series; and a display module;

wherein the first and second inputs receive the first and second signals respectively, the voltage regulating circuit regulates the first signal via voltage drops of the semiconductor elements, the signal switching circuit is switched to receive one of the regulated first signal and the second signal according to a value of the regulated first signal and a value of the second signal, and the signal switching circuit outputs the received signal to the display module;

wherein the signal switching circuit comprises a first transistor and a second transistor, an emitter electrode and a collector electrode of the first transistor are respectively configured to be an first input terminal and an output terminal of the signal switching circuit, a base electrode of the first transistor is directly grounded through a resistor and directly electrically coupled to an emitter electrode of the second transistor through a resistor, the emitter electrode of the second transistor is configured to be an second input terminal of the signal switching circuit, a base electrode of the second transistor is directly grounded through a resistor, and the collector electrode of the second transistor is electrically coupled to the output terminal.

10. The flat panel display as claimed in claim 9, wherein each of the first and second transistors is a positive-negative-positive type bipolar junction transistor.

11. The flat panel display as claimed in claim 9, wherein the semiconductor elements of the voltage regulating circuit comprise a plurality of diodes electrically coupled in series, a positive terminal of each diode is electrically coupled to a negative terminal of the previous diode, the positive terminal of the foremost diode is electrically coupled to the first input of the power supply switching circuit, the negative terminal of the last diode is electrically coupled to the first input terminal of the signal switching circuit.

12. The flat panel display as claimed in claim 11, wherein the plurality of diodes is two diodes.

13. The flat panel display as claimed in claim 12, wherein the first signal is a first voltage signal with a value of 5V, and the second signal is a second voltage signal with a value of 3.3V.

14. The flat panel display as claimed in claim 9, wherein the semiconductor elements of the voltage regulating circuit comprise a plurality of negative-positive-negative type bipolar junction transistors whose collector electrodes are electrically coupled to their own base electrodes, the plural negative-positive-negative type bipolar junction transistors are electrically coupled in series, a base electrode of each transistor is electrically coupled to an emitter electrode of the previous transistor, the base electrode of the foremost transistor is electrically coupled to the first input of the power supply switching circuit, the emitter electrode of the last transistor is electrically coupled to the first input terminal of the signal switching circuit.

15. The flat panel display as claimed in claim 9, wherein the semiconductor elements of the voltage regulating circuit comprise a plurality of positive-negative-positive type bipolar junction transistors whose collector electrodes are electrically coupled to their own base electrodes, the plural positive-negative-positive type bipolar junction transistors are electrically coupled in series, an emitter electrode of each transistor is electrically coupled to a base electrode of the previous transistor, the emitter electrode of the foremost transistor is electrically coupled to the first input of the power supply switching circuit, the base electrode of the last transistor is electrically coupled to the first input terminal of the signal switching circuit.

16. The flat panel display as claimed in claim 9, further comprising a second voltage regulating circuit configured to regulate the second signal before the second signal is outputted to the signal switching circuit, wherein the second voltage regulating circuit comprises a plurality of second semiconductor elements electrically coupled in series.

* * * * *